UNITED STATES PATENT OFFICE.

JOSEPH PIETTE, OF ST.-GILLES, BRUSSELS, BELGIUM, ASSIGNOR TO SOCIETE FRANCO BELGE DE TOURS A COKE, SOCIETE ANONYME, OF BRUSSELS, BELGIUM.

PROCESS FOR THE DIRECT RECOVERY OF AMMONIA FROM DISTILLATION-GASES.

1,356,885.　　　Specification of Letters Patent.　　Patented Oct. 26, 1920.

No Drawing.　　Application filed September 14, 1918.　Serial No. 254,160.

*To all whom it may concern:*

Be it known that I, JOSEPH PIETTE, a subject of the King of Belgium, residing at Saint-Gilles, Brussels, Belgium, have invented certain new and useful Improvements in Processes for the Direct Recovery of Ammonia from Distillation-Gases, of which the following is a specification.

The gases produced in ovens for distilling, cooking or gasifying coals or other mineral fuels contain more or less ammonia. In order to absorb this ammonia by means of commercial sulfuric acid the modern works for obtaining by-products have generally chosen the direct way.

A main requirement to deal with in working a process to recover ammonia directly, is the realization of a uniform and continual crystallization of sulfate of ammonia, even if the local conditions are not the same for different works. A uniform crystallization is insured in the simplest manner, if, by maintaining the bath at an equal acidity, the sulfate settles in it at a temperature near that of the surrounding air. For a continual crystallization it is necessary that the gases by passing through the saturator carry steadily away in a state of vapor all the water which flows into the bath.

It is consequently of great importance for the rational management of works to adjust the different operations for saving the by-products in order to make the working very easy and as independent as possible of the climatic conditions and of the quality and moisture of the fuels to be treated, as well as of the strength of the acid to be used.

To that end it is of great importance to prevent so far as possible, the condensation of water vapor in the ammonia gases coming from the still, because if this is prevented the oven gases, when passing through the saturator, are enabled, under any circumstances, to carry away as vapor all the water which flows into the bath. It is well known that in such conditions the amount of this vapor depends only on the amount of the salt produced and on the strength of the sulfuric acid used.

The process relating to the present invention permits of obtaining this result by sending into the saturator simultaneously with the oven gases cooled to a temperature near that of the surrounding air, the hot ammonia gases coming from the still and previously dried.

The apparatus employed for that purpose is a rectifier having a construction similar to that used in alcohol distilleries. This rectifier is placed after the still in order to dry as far as possible the ammonia gases arriving from the still.

The general working plan of the operations according to the present process may be described as follows:

The gases coming from the distilling, cooking or gasifying ovens are cooled to substantially atmospheric temperature in order to condense the tar-compounds and the larger part of the water vapors.

The condensed ammonical liquor is treated as usual in a still.

After the still there is placed, in the same manner as in apparatus for the rectification of alcohol, a rectifier, from which, by a rational utilization of the heat that the still is supplied with, almost pure, that is to say, dry ammonia gases are obtained, at a temperature of about 90–100° C. preventing at the same time all subsequent condensation of water vapor.

Together with the cooled oven gases these dry and hot ammonia gases from the rectifier are led into a closed saturator which contains the mother liquor having some sulfuric acid. The crystals of sulfate of ammonia which settle are expelled by an injector operated by compressed air.

This process requires neither the bath nor the ejected mother liquor to be heated by means of steam coils nor the gases coming to the saturator to be superheated. The operations being carried on at a temperature near that of the surrounding air, the loss of heat is very low even without special insulation packing of the apparatus, and the calories given by the chemical reaction insure at all times the thermic balance.

This process makes it possible to get satisfactory results in the most widely varying climatic conditions and with all kinds of dry or wet fuels having either a high or low yield of sulfate. It also renders possible the use of weak, impure sulfuric acids of 50° Bmé. for instance, as well as industrial pure acids of 60° Bmé.

What I claim is:

A process for the manufacture of sulfate of ammonia in the purification of the products of distillation containing ammonia, comprising the steps of cooling the retort gas to a temperature equal to that of the air, distilling the ammoniacal liquors resulting therefrom, treating the ammoniacal vapors resulting from distillation in a rectifier to obtain hot ammonia gas free from liquid particles, mixing said ammonia gas with the said cooled retort gases, and introducing the mixture into a closed saturator containing a solution of ammonium sulfate and sulfuric acid.

In testimony whereof I affix my signature in presence of two witnesses.

J. PIETTE.

Witnesses:
J. AMBROISE.
DEMEIRD, S.